Patented Aug. 29, 1944

2,356,759

UNITED STATES PATENT OFFICE 2,356,759

COLOR PHOTOGRAPHIC MATERIAL AND PROCESS FOR PRODUCING SAME

Béla Gáspár, Hollywood, Calif., assignor to Chromogen, Incorporated, a corporation of Nevada No Drawing. Application August 27, 1940, Serial No. 354,443. In Great Britain August 28, 1939

12 Claims. (Cl. 95—6)

The present invention relates to photographic light-sensitive materials in which at least one of the light-sensitive emulsions, used in the form of superposed layers of a multilayer material or in the form of differently sensitized and differently colored emulsion particles distributed within the same layer, is dyed with an azo dye and to improvements in or relating to the process of producing the same.

The invention has for its chief object to provide a material which can be produced in a very simple and reliable manner and in which the dye used for coloring the light-sensitive emulsion has only a negligible tendency to bleed or to diffuse during the manufacture, the storage or the processing of the material.

It is already known to use water insoluble dyes for coloring the light-sensitive emulsions or layers, the insoluble dyes being introduced as such or produced within the colloid from their components by dye synthesis, or from their soluble derivatives, by decomposition. It is obvious that the coloring of the colloid by means of a soluble dye is much simpler than the incorporation of insoluble dyes, it only being necessary to add the dye solution to the colloidal solution or emulsion. On the other hand, it is a well-known fact that most of the water-soluble azo dyes have a strong tendency to diffuse and that owing to this property it becomes necessary to precipitate the soluble dye within the colloid by a precipitating agent. There are only a restricted number of soluble dyes available which can be used without precipitating agent, such as, for example, the dyes referred to and used according to my prior British patent specification No. 445,806.

According to the present invention light-sensitive silver halide emulsions used in the form of superposed layers in a multilayer material or in the form of differently sensitized and differently colored particles are dyed by a water or alkali-soluble azo dye derived from a polymeric aromatic component. The term "polymeric aromatic component" as used herein, is intended to include those compounds, obtained by poly-condensation or chain polymerization, the molecule of which contains or has been treated to contain amino-groups, phenolic hydroxyl groups, diazo groups or acid methylene groups.

It has been found that azo dyes of the kind defined may be used in aqueous solutions for dyeing the solutions or emulsions used in the production of light-sensitive photographic emulsion layers, and it has further been found that in emulsion layers dyed by means of these soluble dyes the dye does not diffuse to a substantial degree even if no auxiliary precipitating agent or mordant is used for fixing the dye. Even the treatment with alkaline treating solutions, such as photographic developers, and with acid treating solutions, such as dye destroying agents of acid properties, does not result in disturbing diffusion. Layers dyed according to the invention are of particular use for carrying out the process of producing dye images by local destruction of the azo dye, as described for example, in my prior United States Letters Patent No. 2,020,775, dated November 12, 1935.

As examples of suitable dyes of the kind defined above there may be cited the azo dye obtained, for instance, by coupling diazotized anhydro - para - (m - amino - benzene sulphamino) benzyl alcohol which may be represented by the polymeric formula:

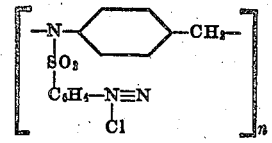

with 2-hydroxy-naphthalene - 3 - 6 - disulphonic acid or the dye obtained by coupling with 1-(p-sulphophenyl)-3-methylpyrazolone-(5) or with N - (p - toluene-sulphonyl) - H - acid. The dyes formed by the coupling reactions may be represented by the polymeric formula:

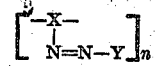

wherein X stands for an aromatic component, Y stands for the coupling component and $n$ is an integer greater than one. Other soluble azo dyes suitable for carrying out the invention are the dyes derived from polymeric aromatic amino or hydroxy compounds, as can be obtained, for example, by nitration of the resinous product, described in Friedländer, vol. 12, page 605, reducing the nitro compound and transforming, if necessary, the amino compound into diazo compounds or phenols.

*Example.*—20 parts by weight of anhydro-p-amino-benzyl alcohol (Friedländer, Fortschritte der Teerfarbenfabrikation, vol. 5, page 91) are dissolved in 100 parts of dimethyl-aniline and to the solution there are added 50 parts of m-nitro-benzol-sulphochloride. The reaction sets in and the temperature of the solution rises. The reaction is completed by heating to about 80° C. for about 15 minutes. The solution is poured into 1,000 parts of 10% hydrochloric acid and the viscous product thus obtained is allowed to solidify. It mainly consists of the anhydro-para-(m-nitrobenzene - sulphamido) - benzylalcohol. The raw product is dissolved in pyridine and the solution stirred together with a solution of 180 parts of sodium carbonate in 1,000 parts of water of about 50° C. 180 parts of pulverized sodium hydrosulphite are then suspended in the mixture and the whole is stirred under heating for about a quarter of an hour. Thereafter, water is added to the mixture in order to dissolve the pyridine. The amino compound is separated from the aqueous solution and thereafter diazotized. Normal sodium nitrite solution is used for this purpose and added gradually until a slight excess of nitrous acid remains. The diazonium salt solution is coupled in the presence of sodium acetate with an amount of N-(p-toluene-sulphonyl)-H-acid which is equivalent to the amount of sodium nitrite consumed during the diazotization. A water-soluble magenta dye is obtained which can be precipitated from the solution by the addition of sodium acetate. The dyes obtained by replacing the coupling component used in the example by 2-hydroxy-naphthalene-3-6-disulphonic acid or by the 1-(p-sulphophenyl)-3-methyl-pyrazolone-5 are water-soluble dyes of orange and yellow color, respectively.

Suitable dyes can also be obtained by replacing the anhydro-p-(m-amino-benzene-sulphamido)-benzyl-alcohol by its sulphonic acids which may be obtained as follows: 10 grams of anhydro-p-aminobenzylalcohol, dissolved in 50 ccs. of fuming sulphuric acid (20% SO₃), are heated for about 5 minutes at 150° C., until a sample has become soluble in diluted sodium carbonate solution. The mixture is cooled and poured onto ice, the precipitate filtered and washed. The sulphonic acid is dissolved in sodium acetate solution and an excess of m-nitrobenzene sulphonyl chloride is added. The solution is stirred for several hours and then heated to boiling. Hydrochloric acid is added and the precipitated compound filtered and washed. It is then dissolved in sodium acetate solution, heated to boiling and added gradually to a boiling suspension of iron powder in water slightly acidified by a few drops of hydrochloric acid. After the nitrocompound has been reduced, sodium carbonate is added and the solution separated from the iron and the precipitated iron salts. Hydrochloric acid is added to the solution, the precipitated compound filtered off, washed and dried at 100° C.

For the production of dyes the amino-compound is dissolved in sodium carbonate solution, sodium nitrite and thereafter hydrochloric acid are added. The surplus of nitrite is destroyed by the addition of urea and the diazonium salt solution is poured into a solution of N-(p-toluene-sulphonyl)-H-acid, dissolved in sodium acetate solution. After about one hour the solution is heated and the dye salted out.

For the coloring of emulsions the dyes are dissolved in water or, if they contain free acid groups, in diluted alkali. The solutions are added to the light-sensitive emulsion or to the gelatin solution which, thereafter, is mixed with light-sensitive silver halide emulsion. The colored emulsion is coated to form a layer in a multi-layer light-sensitive material, about one gram of dye or 2 grams being used per sq. m. emulsion layer. Differently colored and differently sensitized emulsions may be used for producing superposed layers in multi-layer material or may be distributed in a binding agent and coated on a support to form a single layer in which the differently colored emulsions are present in the form of differently sensitized particles. From these emulsions the dye does not diffuse to a substantial degree during the production and during the processing of the light-sensitive material.

The dyes may be used not only for the production of light-sensitive layers but also for producing filter layers adjacent to a light-sensitive silver halide emulsion layer. In this case also the material is improved by the non-diffusing properties of the dye.

I claim:

1. A photographic material comprising at least two superposed colloid layers, at least one of the layers comprising a light-sensitive silver halide emulsion layer and at least one layer containing therein a water or alkali soluble dye which has a polymeric structure (—A—Aryl—)$_n$ formed by identical members A-Aryl wherein A stands for a chemical group that links the Aryl radicals together and $n$ stands for an integer greater than one, each of the members A-Aryl carrying an azo group in a side chain with respect to the polymeric structure and the dye being substituted by salt forming groups.

2. A photographic material comprising a light-sensitive silver halide emulsion layer containing therein a dye which has a polymeric structure (—A—Aryl—)$_n$ formed by identical members A-Aryl wherein A stands for a chemical group that links the Aryl radicals together and $n$ stands for an integer greater than one, each of the members A-Aryl carrying an azo group in a side chain with respect to the polymeric structure and the dye being soluble in the colloid.

3. A photographic material comprising at least two superposed colloid layers at least one of the layers comprising a light sensitive silver halide emulsion layer and at least one layer containing therein a water or alkali soluble dye derivative of a polymeric substance of the following general structure

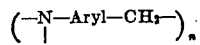

formed by identical members

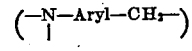

and wherein $n$ stands for an integer greater than one, said dye having an azo dye radical linked to said polymeric substance through the intermediary of the nitrogen atom.

4. A photographic material comprising a light sensitive silver halide emulsion layer and at least one layer containing therein a water or alkali soluble dye derivative of a polymeric substance of the following general structure

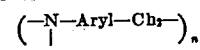

formed by identical members

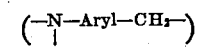

and wherein $n$ stands for an integer greater than one, said dye having an azo dye radical linked to said polymeric substance through the intermediary of the nitrogen atom and the dye being substituted by salt forming groups.

5. A photographic material comprising at least two superposed colloid layers, at least one of the layers comprising a light-sensitve silver halide emulsion layer and at least one layer containing therein a water or alkali-soluble azo dye derivative of polymeric anhydro-p-amino-benzyl alcohol, said dye having an azo dye radical linked to said anhydro-p-amino benzyl alcohol by the intermediary of the nitrogen atom and said dye being substituted by salt forming groups.

6. A photographic material comprising a light-sensitive silver halide emulsion layer having dissolved therein a dye derivative of polymeric anhydro-p-amino benzyl alcohol, said dye having an azo dye radical linked to said anhydro-p-amino-benzyl alcohol by the intermediary of the nitrogen atom and said dye being substituted by salt forming groups.

7. A photographic material comprising at least two superposed colloid layers, at least one of the layers comprising a light-sensitive silver halide emulsion layer and at least one layer containing therein a dye derivative of polymeric anhydro-p-amino benzyl alcohol, said dye having an azo dye radical linked to said anhydro-p-amino benzyl alcohol by the intermediary of the nitrogen atom and said dye being soluble in the colloid.

8. A photographic material comprising at least two superposed colloid layers, at least one of the layers being a light-sensitive silver halide emulsion layer containing therein a dye derivative of polymeric anhydro-p-amino benzyl alcohol, said dye having an azo dye radical linked to said anhydro-p-amino benzyl alcohol by the intermediary of the nitrogen atom and said dye being soluble in the colloid.

9. In a process for producing a colored light-sensitive colloid for photographic purposes, the step of applying to said light-sensitive colloid an azo dye which is soluble in aqueous medium and which has a polymeric structure (—A—Aryl—)$_n$ formed by identical members A-Aryl wherein A stands for a chemical group that links the Aryl radicals together and $n$ stands for an integer greater than one, each of the members A-Aryl carrying an azo group in a side chain with respect to the polymeric structure and the dye being substituted by salt forming groups.

10. In a process for producing a colored photographic material in which a plurality of colloid layers are coated one upon the other, at least one of said layers being a light-sensitive silver halide emulsion layer and at least one of said adjacent layers being a colored colloid, the step which comprises coloring the colloid used for the production of said colored colloid layer with an azo dye which is soluble in an aqueous medium and which has a polymeric structure (—A—Aryl—)$_n$ formed by identical members A-Aryl wherein A stands for a chemical group that links the Aryl radicals together and $n$ stands for an integer greater than one, each of the member A-Aryl carrying an azo group in a side chain with respect to the polymeric structure and the dye being substituted by salt forming groups.

11. In a process for producing a colored light-sensitive colloid for photographic purposes, the step of applying to said light-sensitive colloid an azo dye which is soluble in an aqueous medium and which is a derivative of polymeric anhydro-p-amino benzyl alcohol, said dye having an azo dye radical linked to said anhydro-p-amino benzyl alcohol by the intermediary of the nitrogen atom and said dye being substituted by salt forming groups.

12. In a process for producing a colored photographic material in which a plurality of colloid layers are coated one upon the other, at least one of said layers being a light-sensitive silver halide emulsion layer and at least one of said adjacent layers being a colored colloid, the step which comprises coloring the colloid used for the production of said colored colloid layer with an azo dye which is soluble in an aqueous medium and which is a derivative of polymeric anhydro-p-amino benzyl alcohol, said dye having an azo dye radical linked to said anhydro-p-amino benzyl alcohol by the intermediary of the nitrogen atom and said dye being substituted by salt forming groups.

BÉLA GÁSPÁR.